(No Model.) 2 Sheets—Sheet 1.

M. BIERLINE.
BRICK MACHINE.

No. 469,225. Patented Feb. 23, 1892.

WITNESSES:

INVENTOR
Michael Bierline
BY Louis Freeser & Co.
HIS ATTORNEYS.

(No Model.) 2 Sheets—Sheet 2.
M. BIERLINE.
BRICK MACHINE.
No. 469,225. Patented Feb. 23, 1892.
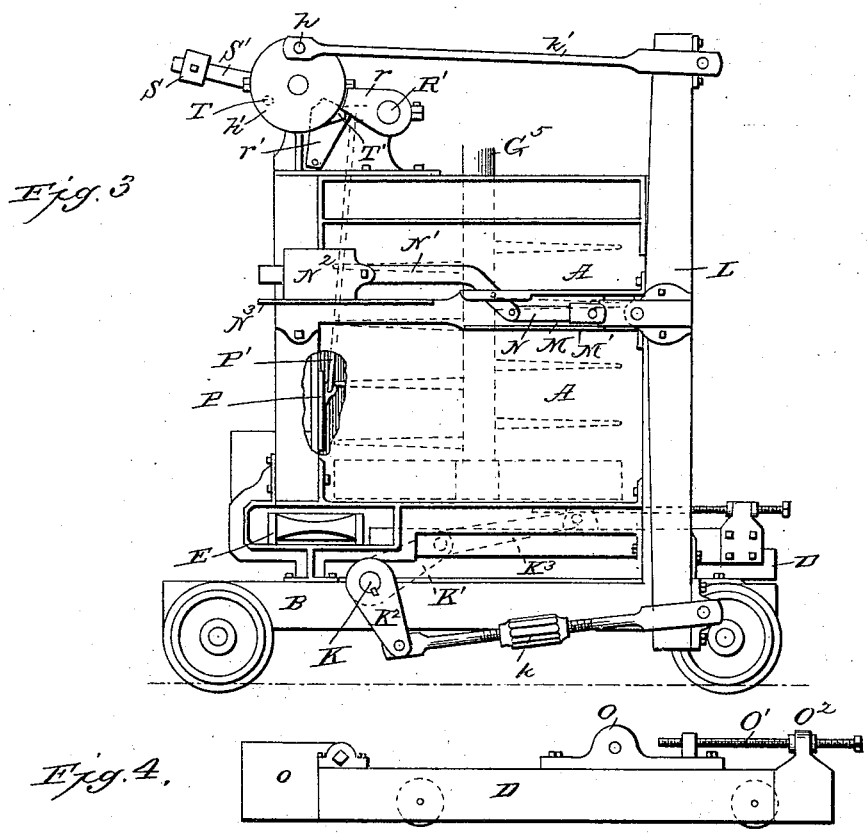
Fig. 3
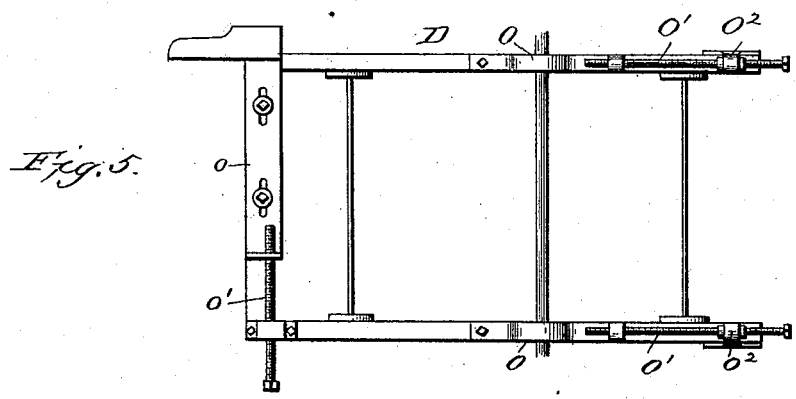
Fig. 4.
Fig. 5.
WITNESSES:
Alvan C Macauley
Alex J Stewart
INVENTOR
Michael Bierline,
BY Louis Freser & Co.
HIS ATTORNEYS United States Patent Office.

MICHAEL BIERLINE, OF CHASKA, MINNESOTA.

BRICK-MACHINE.

SPECIFICATION forming part of Letters Patent No. 469,225, dated February 23, 1892.

Application filed February 24, 1891. Serial No. 382,551. (No model.)

*To all whom it may concern:*

Be it known that I, MICHAEL BIERLINE, of Chaska, in the county of Carver and State of Minnesota, have invented certain new and useful Improvements in Brick-Machines; and I do hereby declare the following to be a full, clear, and exact description of the same, reference being had to the accompanying drawings, forming a part of this specification, and to the letters of reference marked thereon.

This invention relates particularly to that class of brick-machines in which the kneaded clay or mud is forced into a press-box by suitable stirring mechanism and from the press-box into the molds beneath the same, which molds are moved across the open side of the press-box in succession, the object of the invention being to provide a machine having great power and of simple design, with devices for insuring an even and regular pressure on the plastic clay when in any condition, whereby the bricks are made true and the machine is made to work more freely, a further object being to provide an automatic safety device to prevent the breakage of the machine or molds should any foreign substance jam in the same and prevent its free operation.

Figure 1:
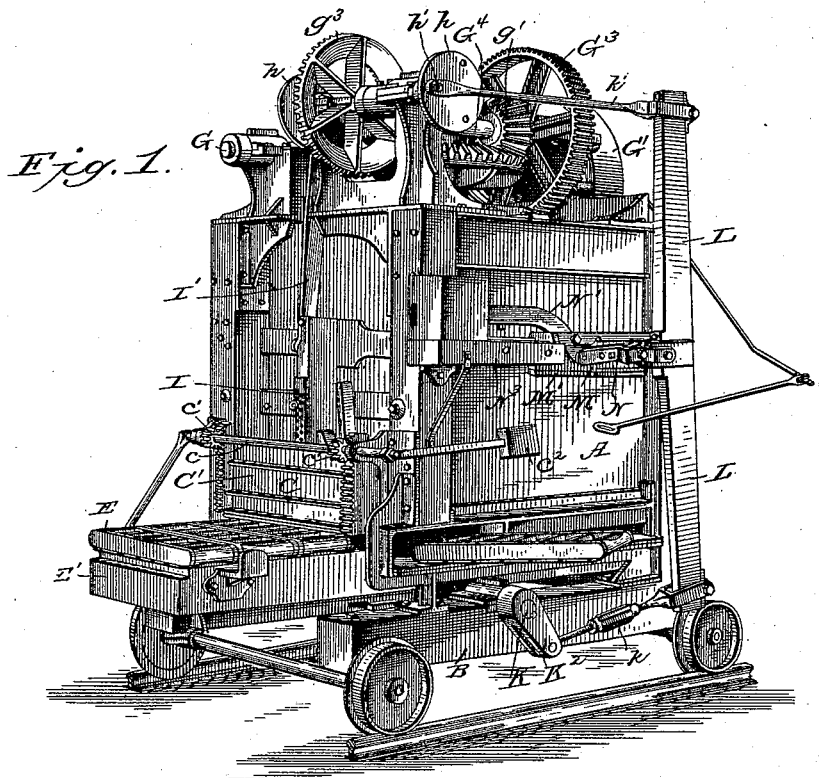
Figure 2:
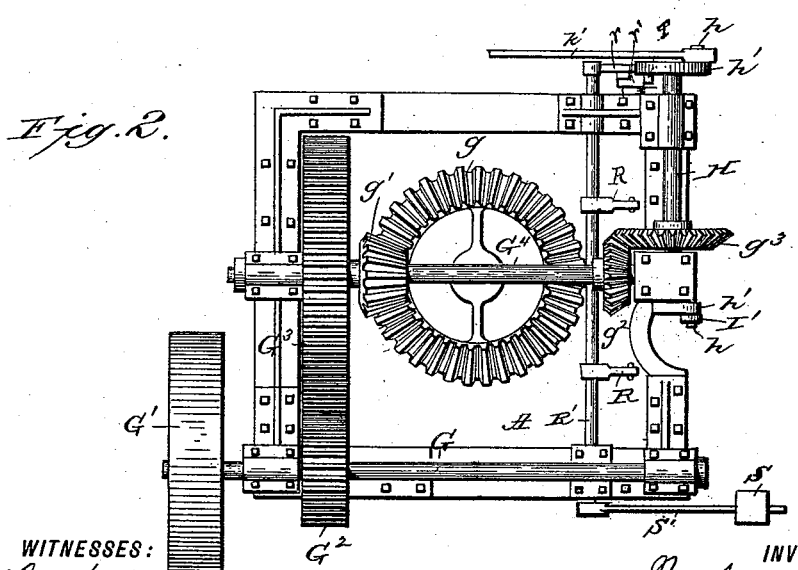

Referring to the accompanying drawings, Figure 1 is a perspective view of a machine constructed in accordance with my invention. Fig. 2 is a top plan view of the same. Fig. 3 is a sectional view showing the sliding door for closing the press-box and the operating mechanism therefor, omitted in Fig. 1 for the sake of clearness. Fig. 4 is a side elevation of the mold-carriage and its crank connection. Fig. 5 is a top plan view of the carriage.

Similar letters of reference in the several figures indicate the same parts.

The hopper A, in which the clay is worked into a homogeneous mass suitable for being pressed into the brick-molds, is preferably constructed of iron, with suitable corner-braces extending down and firmly bolted to a base-frame B, which may be mounted upon trucks, as shown in Fig. 1.

Referring to Fig. 1, it will be seen that in front of the hopper, at the bottom, is formed the press-box C, having the movable cut-off or strike-plate C' in front thereof, which strike-plate has rack-teeth at each end and is adapted to be depressed with a yielding pressure by the shaft $c$, having the pinion $c'$, engaging the said rack-teeth and the weighted arm $c^2$, as will be readily understood. Immediately beneath the press-box and, in fact, extending beneath the whole hopper is a space in which the molds E and mold-carriage D are placed.

The mold-carriage (see Figs. 4 and 5) consists of the frame-work D, having its forward end properly shaped to engage the flat sides of the molds and is reciprocated back and forth beneath the hopper, the stroke being sufficient to move one mold or connected series of molds lying side by side clear across the open bottom of the press-box.

In operation the molds are successively inserted during the time the carriage is retracted through the opening at the end of the press-box, (see Fig. 1,) and by mechanism to be presently described are then pressed full of clay and as the carriage moves forward are forced out at the front of the machine onto the platform or table E', the strike-plate serving to remove any surplus.

The main drive-shaft G, Fig. 2, is journaled in bearings at the top of the hopper and is provided with a band-pulley G' or other suitable device, to which the power is communicated, and with a gear-wheel $G^2$, which meshes with a large gear-wheel $G^3$ on the secondary drive-shaft $G^4$, also journaled in bearings at the top of the hopper. The secondary drive-shaft $G^4$ passes across the center of the hopper, and immediately below it is located the shaft $G^5$, carrying the grinding and kneading or stirring devices, said shaft being rotated by means of the beveled cog or bull wheel $g$, with which gears the small beveled cog-wheel $g'$ on the secondary drive-shaft. At the forward end of the secondary drive-shaft is another beveled cog-wheel $g^2$, which meshes with a corresponding cog-wheel $g^3$ of somewhat larger diameter on the plunger drive-shaft H, journaled in bearings at the front of the hopper. This shaft H has cranks at each end, preferably formed by pins $h$, located in disks $h'$, keyed to the ends of the shaft, and one of these cranks is approximately at the center of the front of the machine in position to operate the plunger I, working within the press-box through the medium of the pitman I'.

(See Fig. 1.) The pitman, it will be seen, works through a cut-out portion of the frame at the top of the hopper, permitting the press-box to be located close to the hopper and thereby make the machine very compact.

The mold-carriage for advancing the molds is operated by the crank-pin at the opposite end of the shaft H and is permitted to stop should an obstruction, such as a stone or other foreign body, become jammed in the mold or press-box without breaking the machine, as follows: Journaled in bearings beneath the hopper, Figs. 1 and 3, is a crank-shaft K, having cranks K' K' K² thereon, the inner ones K' of which are connected to the mold-carriage by means of the links K³, and the outer one is connected by the adjustable link $k$ with the lower end of the pivoted lever L. Lever L is pivoted at approximately the center on a yielding fulcrum, and its upper end is connected to the crank-pin $h$ by means of the pitman $k'$. The pivot of the lever L is horizontally movable, being preferably formed in a block M, which is mounted in bearings M', and this block M is connected by a link N with the lower short end of a pivoted lever N', carrying on its long end an adjustable weight N², the parts being so proportioned as that the weight is sufficient to hold the pivot of the lever L in position so long as the condition of the material being operated upon is normal; but should the mold-carriage be arrested, as aforesaid, the abnormal pressure would elevate the weight, and by permitting the pivotal point to yield inward would allow the operating mechanism to continue its movement without breaking any of the parts.

The weight N², it is obvious, may be adjusted along its lever when the machine is designed for working on clay of different consistency and in normal position is adapted to rest upon the bracket N³, which is long enough to accommodate it in any position of adjustment.

Referring now particularly to Figs. 4 and 5, it will be seen that the bearing O for the connecting-link K³ is adjustable, and is held in adjusted position by the long set-screw O', mounted in fixed bearings O² on the end of the carriage. At the front end the carriage is provided with an adjustable gage $o$ which is held in adjusted position by a screw $o'$, and is adapted to regulate the depth of the opening into which the molds are pushed, thereby permitting long or short molds to be used, as will be readily understood.

In Fig. 3 is shown a gate P, having a vertical sliding movement across the open side of the press-box next to the hopper and adapted to be depressed to close said opening immediately before the descent of the plunger, which discharges the clay from the press-box into the mold. This sliding gate is connected by a pitman P' to a crank R on a shaft R', journaled in bearings at the top of the machine, Figs. 2 and 3, and is depressed by the weight S on the end of the arm S', mounted on the end of said shaft. During the time the press-box is being filled by the stirrers within the hopper the gate is held elevated by the crank-arm $r$, which rests on the pivoted block $r'$, and at the proper moment said block is thrown out from beneath the crank-arm by means of the pin T, the crank-arm being again returned to normal position by the projection T', both said pin and projection being located on the disk $h'$ on the outer end of the shaft H.

In operation the power is applied, as before mentioned, to the belt-pulley G' and the train of gears in communication therewith set in motion, and a mold having been placed beneath the press-box the sliding gate descends to prevent the escape of any of the material within the press-box. Then the plunger is forced down, compressing the clay firmly within the mold, and as the plunger retreats the mold-carriage advances and moves the mold forward of the press-box, leaving a space for the succeeding mold, which is inserted the moment the carriage has retreated.

Having thus described my invention, what I claim as new is—

1. In a brick-machine, the combination, with the hopper, press-box communicating therewith, plunger working within the press-box, and gate for closing the opening between the press-box and hopper, of the reciprocating mold-carriage working below the press-box, and the removable molds, substantially as described.

2. In a brick-machine, the combination, with the hopper, open-bottom press-box communicating therewith, gate for closing the opening between the press-box and hopper, plunger working within the press-box, and plunger-driving shaft having the cranks thereon, of the reciprocating mold-carriage and the lever for reciprocating and link connecting the same to the crank on the plunger-driving shaft, substantially as described.

3. In a brick-machine, the combination, with the hopper, press-box, and plunger working in the press-box, of the sliding gate for closing the opening between the hopper and press-box, the shaft having the cranks connected to said gate, with the weighted arm for depressing the same, the drive mechanism having a projection for elevating said cranks and gate, and a movable block for holding the same elevated, substantially as described.

4. In a brick-machine, the combination, with the hopper, press-box communicating therewith, plunger working in said press-box, and the drive-shaft for said plunger, having the disk at one end thereof, of the gate for closing the opening between the press-box and hopper, the crank-shaft connected to said gate for moving the same, the weighted arm for depressing the gate, and the projection on the disk for elevating the same, substantially as described.

5. In a brick-machine such as described, the combination, with the hopper and driving mechanism, of the mold-carriage, the adjustable bearing mounted on said carriage, the shaft having the cranks connected to said bearings, and connections between said shafts and the driving mechanism for reciprocating said carriage, substantially as described.

6. In a brick-machine such as described, the combination, with the hopper and driving mechanism, of the mold-carriage reciprocated thereby, having the adjustable gage at the forward end for limiting the insertion of the molds, substantially as described.

In testimony whereof I have hereunto set my hand in presence of two subscribing witnesses.

MICHAEL BIERLINE.

Witnesses:
P. W. FARICY,
LOUIS FEESER, Jr.